A. DE MEURISSE.
SYSTEM FOR KEEPING ACCOUNTS.
APPLICATION FILED FEB. 10, 1921.
1,402,578.
Patented Jan. 3, 1922.
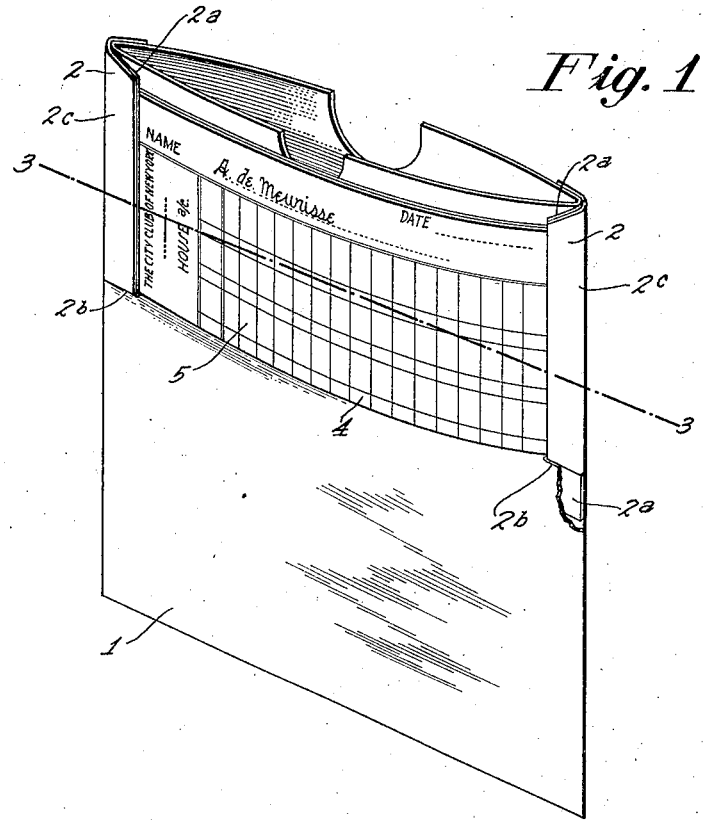
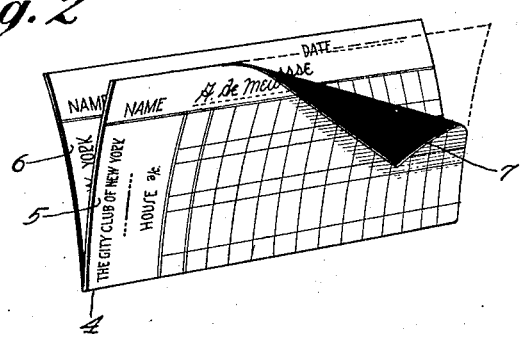
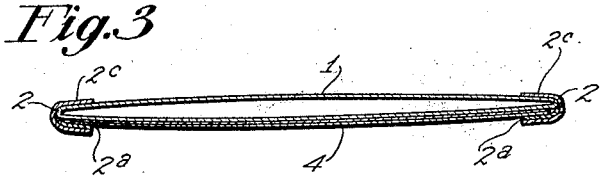
INVENTOR.
Alfred de Meurisse
BY
Jas. H. Griffin
ATTORNEYS

UNITED STATES PATENT OFFICE.

ALFRED DE MEURISSE, OF NEW YORK, N. Y.

SYSTEM FOR KEEPING ACCOUNTS.

1,402,578.  Specification of Letters Patent.  Patented Jan. 3, 1922.

Application filed February 10, 1921. Serial No. 443,756.

*To all whom it may concern:*

Be it known that I, ALFRED DE MEURISSE, a citizen of the United States, residing at New York City, borough of Manhattan, in the county and State of New York, have invented a certain new and useful System for Keeping Accounts, of which the following is a specification.

This invention is a system for keeping accounts, and is particularly adapted for use in hotels, clubs, etc., to simplify and facilitate the keeping of accounts of individual patrons or members in an efficient and economical manner.

It has heretofore been the practice, particularly in clubs, to provide an envelope or folder for each club member, bearing the name of the member, the date of the transaction, and to record on such envelope or folder the various charges, and sometimes other data, pertaining to the member. The envelopes or folders are usually filed in trays or drawers, and when a charge is to be entered against any particular member, this member's envelope or folder is withdrawn from the tray or drawer and the charge entered thereon, whereupon it is returned to its place. At suitable periods, usually monthly, the charges are totaled, entered in a ledger, and statements of account made out for the members. These monthly statements embody merely a total of the particular member's charges, and the recipient thereof has no means of checking up the accuracy of the total indebtedness appearing on the statement, or the individual items entering into it, unless he has, and this is not customary, kept a private personal account.

With the foregoing consideration in mind, the present invention embodies a system for use in keeping accounts which permits of an itemized account, as well as copies of the vouchers on which the account is based, being sent to each patron or club member. Moreover, this result is accomplished without necessitating any more labor than is requisite in keeping accounts by the old, and, manifestly inadequate system. In this way, questions of correctness in the account may be readily checked up, to the entire satisfaction of the patron or club member. Moreover, in the old system referred to, the envelopes are thrown away or discarded after they have served for a given accounting period, a new or fresh envelope being used on each occasion of starting a new account.

In accordance with the present invention, however, the envelope, per se, does not contain any notations, and the system is such that the envelope is used repeatedly, though not necessarily for the same member, until it is worn out. By providing envelopes properly made from suitable material, the wear is comparatively slight, so that they may be used for long periods of time.

The invention, in its preferred embodiment, consists of an envelope provided, on its exterior, with means for maintaining a record folder removably in position. The record folder preferably consists of two sheets, the front pages of each of which bears the same lining and printed matter, on which the name of the member and date of the account may be written, and constitute blanks on which charges may be entered. The back of the first sheet is preferably coated with a composition, analogous to that used on carbon paper, a non-smudging coating being, of course, desirable, and the folder is adapted to be normally maintained in position on the envelope so that the member's name is readily apparent even when the various envelopes are filed away.

In practicing the system, the entries are made from time to time on the first page of the folder, without removing it from the envelop, and the carbon deposit on the back page thereof results in a duplication of the charges or entries on the front page of the second sheet. It will be manifest that the sheets need not necessarily be attached together, and that, if desired, more than two sheets may be employed. Instead of the folder being coated as described, a loose sheet of carbon paper may be employed, as is customary in making facsimile copies, although it will be apparent that the preferred method of the procedure outlined has advantages over using loose carbon sheets. The folder is retained on the envelope for a month, or for any other period over which the account extends. In the meantime, the vouchers, from which the bookkeeping department enters the items on the folder, are placed in the envelope. At the expiration of the accounting period, the charges on the folders are totaled, and a statement of this total sent to the member.

The envelope is then filed away until such time as the member remits the amount of the statement. Thereupon the folder is removed from the envelope and the leaves thereof separated. The first page is filed for reference and the duplicate, together with the vouchers, are sent to the member, thereby enabling him to check up the correctness of the account which he has paid.

When any particular member's account is settled, the envelope is returned to a stock drawer and may be used again for either an old member or any other member.

Features and advantages of the present invention, other than those specified, will be apparent from the hereinafter detailed description and claims, when read in conjunction with the accompanying drawings.

The accompanying drawings illustrate one practical embodiment of the invention, but the construction therein shown, is to be understood as illustrative, only, and not as defining the limits of the invention.

Figure 1 is a perspective view of combined envelope and folder employed in the practicing of the system of this invention.

Figure 2 shows the folder detached, and the front page thereof curled back to show the carbon deposit on the back face thereof; and, Figure 3 is a section on the line 3—3 of Figure 1.

Referring to the drawings, 1 designates an envelope of any desired style or material, its chief function being to serve as a container for permanent records in a manner hereinafter described. The envelope 1 is provided on its lateral edges with inturned flanges or wings 2, providing means for supporting a folder 4 detachably in position on the front of the envelope 1. The flanges 2 also serve as guides to facilitate the positioning of the holder in place.

While the flanges 2 may be formed in any suitable manner, I have shown them for the purpose of illustration in the form of two strips $2^a$, which are placed parallel along the upper portion of the lateral edges of the envelope with their lower ends extending through slits $2^b$ into the interior of the envelope. The strips $2^a$ may be held in position by gummed strips $2^c$, which are adhesively secured to the front faces of the strips $2^a$ folded around the lateral edges of the envelope and are pasted to the back of the envelope. The gummed strips maintain the strips $2^a$ in position and the passing of the strips $2^a$ through slots in the envelope serve to close the lower end of the guide ways thus formed, so that the folder 4 cannot drop down. The flanges 2 may be constructed in any other suitable manner but the form shown may be mechanically and efficiently manufactured.

The folder 4, as most usually employed, embodies two sheets 5 and 6 made by folding a rectangular sheet of paper along its medial line, which, in practice, is preferably perforated or scored so as to permit of the sheets 5 and 6 being readily detached from each other. The front faces of both sheets are, in the preferred embodiment of the folder, suitably lined and printed upon to provide convenient blank forms for the entry of accounts or items of charge or expense, while the inner surface of the front sheet 5 is coated with a carbon deposit similar to that employed in making carbon paper. The lining and printing on the two sheets 5 and 6 are identical, and are so placed that they will register, whereby the charges or other notations written on the front of sheet 5 will be immediately transferred through the carbon surface 7 to the front of sheet 6.

The folder 4 is adapted to be normally retained in position on the envelope, as shown in Figure 1, and the envelope, in turn, is placed in a readily accessible tray or drawer. As the items are to be charged against the member or patron, from time to time, the envelope is withdrawn from the tray, and, without removing the folder from the envelope, the charges or other information are entered upon the front sheet of the folder and are simultaneously transferred by the carbon surface 7, or other expedient, to the face of the back sheet 6. When it becomes time to bill the member or patron, the procedure hereinbefore described, or its equivalent is followed.

While the sheets or leaves, whether loose or in the form of a folder may be plain, they usually contain certain data and are usually so ruled as to facilitate their use for the particular purpose desired.

The system described is simple, practical and efficient, and arguments or questions as to charges are minimized, since the patron or member can check up dates and amounts from the itemized statement and accompanying vouchers with which he is furnished.

All the specific features described need not necessarily be employed together, or for the special purpose or in the particular environment outlined; accordingly, the scope of the invention is to be regarded as broadly novel as is commensurate with the appended claims.

Having thus fully described the invention, what I claim as new and desire to secure by Letters Patent is:

1. A new article of manufacture for facilitating the keeping of accounts embodying an envelope, provided with flanges exteriorly thereof, adapted to contain or support a folder, in combination with a folder embodying two leaves, the front faces of both of which contain the same blank forms in juxtaposed relation and the rear face of the front leaf containing a carbon deposit serving to transfer writing delineated on the face of the front leaf on to the face of the back leaf, whereby a duplicate record may be kept on the folder without requiring removal of the folder from the envelope.

2. A new article of manufacture for facilitating the keeping of accounts embodying an envelope, and means for detachably mounting a folder on the envelope, in combination with a folder comprising two leaves, the front face of each of which contains corresponding data and means, whereby when notations are applied to the face of one leaf, they are automatically duplicated on the face of the other leaf.

3. A new article of manufacture for facilitating the keeping of accounts embodying a holder or container provided with means for supporting a plurality of juxtaposed leaves, in combination with a plurality of leaves, the front faces of all of which are adapted to contain corresponding data, and means whereby duplicate records may be simultaneously produced on all of the leaves.

4. A new article of manufacture for facilitating the keeping of accounts embodying an envelope open at its top and provided at its lateral edges with exterior flanges extending downwardly from the open upper edge of the envelope and adapted to receive and support a two-leaf folder, in combination with a two-leaf folder, the front faces of the leaves of which are adapted to contain the same data, said folder embodying means whereby the record made on the face of the front leaf is duplicated on the front face of the second leaf.

5. A new article of maufacture for facilitating the keeping of accounts embodying an envelope open at its top and provided near its lateral edges with means extending downwardly from the open upper edge of the envelope and adapted to receive and support a suitable record member, in combination with a record member, of a character which permits of the simultaneous production of duplicate records or other data thereon.

In testimony whereof, I have signed my name to this specification.

ALFRED DE MEURISSE.